W. M. CHAPMAN.
BELT-FASTENER.
No. 169,416. Patented Nov. 2, 1875.
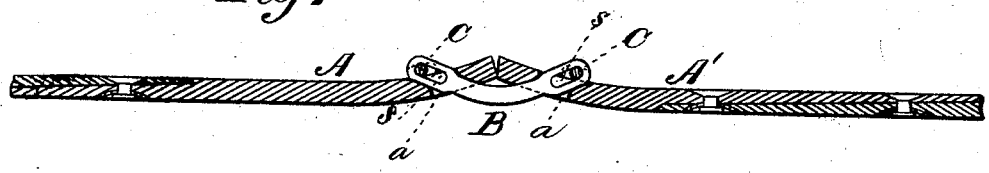
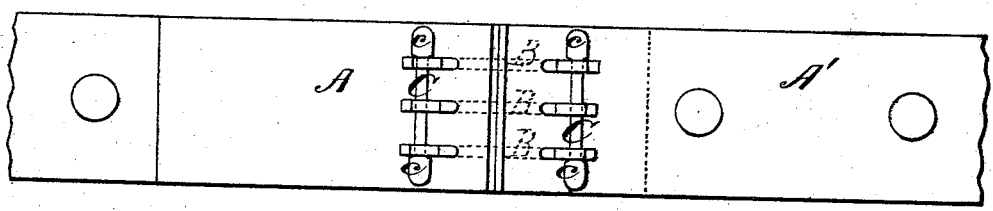

UNITED STATES PATENT OFFICE.

WILLIAM M. CHAPMAN, OF RAVENNA, OHIO.

IMPROVEMENT IN BELT-FASTENERS.

Specification forming part of Letters Patent No. 169,416, dated November 2, 1875; application filed August 28, 1875.

*To all whom it may concern:*

Be it known that I, WILLIAM M. CHAPMAN, of Ravenna, in the county of Portage and State of Ohio, have invented a new and valuable Improvement in Belt-Fasteners; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal section of my belt-fastening, and Fig. 2 is a plan view thereof.

This invention has relation to improvements in belt-fasteners; and the nature of the invention consists in curved metallic rods, having through their ends an oblong slot, which bars are inserted into apertures made in the ends of the belt, and are held against being drawn out of the same by means of a latch-pin passing through the slotted ends of the said rods, whereby a very strong union of the ends of the belt is secured, as will be hereinafter more fully explained and claimed.

In the annexed drawings, A A′ designate the two ends of an ordinary belt, having a number of spaced slots, a, cut through them. These slots occupy in each end the same relative position—that is to say, they are at an equal distance apart, and equidistant from the lateral edges of the belt. B represents curved metallic rods of suitable strength, having slightly-broadened ends, through which, preferably, oblong slots s are cut, for a purpose hereinafter explained.

The ends of the belt having been approximated, as shown in Fig. 1, the ends of rods B are passed through the slots in the belt ends occupying the same relative positions, projecting through the said belt sufficiently to expose slots s in the ends of the rods. A latch-bar, C, is then passed through all the slots in adjacent ends of rods B, thereby preventing the latter from becoming detached from the belt, and thereby holding the belts to a rigid but easily-dissolved union.

In order that latch-rods C may not become casually detached from the link-rods B during the operation of the belt, I have employed the following easily-adjusted and reliable device: Latch-rods C are provided at each end with a shouldered enlargement, c, greatly resembling the blade of a paddle, which enlargement will readily pass through slots s in the ends of the link-rods, but which, being of greater width than the said slots, will, when the said rods are given a quarter rotation, be held against endwise displacement, whereby the said rods would be allowed to escape from the slots in the link-rods, thereby disuniting the belt ends.

It is evident, when the belt is stretched over pulley-wheels, that the flat side of enlargements c will be pressed against the belt with considerable force, thus preventing the latch-rod from the slightest rotation, and absolutely preventing its withdrawal from the slots in the link-rods.

What I claim as new, and desire to secure by Letters Patent, is—

1. In a belt-fastener, the combination, with the curved link-rods B, having slots s, of the latch-rods C, having shouldered enlargement c, substantially as specified.

2. The latch-rod C, having an enlargement, c, at each end, adapted for use substantially as specified.

3. The combination, with the belt-ends A A′, having slots a, of the curved slotted link-rods B and latch-rods C, substantially as specified.

In testimony that I claim the above I have hereunto subscribed my name in the presence of two witnesses.

WILLIAM M. CHAPMAN.

Witnesses:
E. P. HATFIELD,
M. W. PHELPS.